(12) United States Patent
Fuyuki

(10) Patent No.: US 7,551,206 B2
(45) Date of Patent: Jun. 23, 2009

(54) IMAGE-CAPTURING APPARATUS APPLYING AT LEAST COLOR REPRODUCTION PROCESSING TO CAPTURED IMAGE

(75) Inventor: Ritsuko Fuyuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 622 days.

(21) Appl. No.: 10/867,727

(22) Filed: Jun. 16, 2004

(65) Prior Publication Data

US 2004/0263642 A1 Dec. 30, 2004

(30) Foreign Application Priority Data

Jun. 23, 2003 (JP) ............................. 2003-177830

(51) Int. Cl.
*H04N 9/73* (2006.01)

(52) U.S. Cl. .................................. 348/223.1

(58) Field of Classification Search ............. 348/223.1, 348/224.1, 225.1, 655, 656, 657, 658; 382/167
See application file for complete search history.

(56) References Cited

U.S. PATENT DOCUMENTS

| 6,229,916 | B1 * | 5/2001 | Ohkubo | 382/167 |
| 6,459,449 | B1 | 10/2002 | Juen | |
| 6,504,952 | B1 * | 1/2003 | Takemura et al. | 382/167 |
| 6,727,943 | B1 * | 4/2004 | Juen | 348/223.1 |
| 2002/0031258 | A1 * | 3/2002 | Namikata | 382/165 |
| 2003/0164828 | A1 | 9/2003 | Hung | |
| 2003/0185440 | A1 * | 10/2003 | Takeshita et al. | 382/167 |
| 2004/0095478 | A1 * | 5/2004 | Takano et al. | 348/223.1 |
| 2004/0126012 | A1 * | 7/2004 | Sakaida | 382/167 |

FOREIGN PATENT DOCUMENTS

| JP | A 02-298193 | 12/1990 |
| JP | A 06-351038 | 12/1994 |
| JP | 10-191378 A | 7/1998 |

* cited by examiner

*Primary Examiner*—Lin Ye
*Assistant Examiner*—Jason Whipkey
(74) *Attorney, Agent, or Firm*—Oliff & Berridge, PLC

(57) ABSTRACT

An image-capturing apparatus according to the present invention can perform color reproduction processing appropriate to illuminants illuminating the subject, without an increase in memory capacity. For that purpose, the image-capturing apparatus of the present invention includes: an image-capturing unit generating a captured image of a subject; a recording unit recording one or more color reproduction matrices in association with each of a plurality of predetermined kinds of illuminants; a computing unit computing a corrected color reproduction matrix by performing interpolation processing based on at least two color reproduction matrices associated with different kinds of illuminants, out of the color reproduction matrices recorded in the recording unit; and a color reproduction processing unit applying color reproduction processing to the image generated by the image-capturing unit, by using the corrected color reproduction matrix.

2 Claims, 8 Drawing Sheets

IMAGE-CAPTURING APPARATUS APPLYING AT LEAST COLOR REPRODUCTION PROCESSING TO CAPTURED IMAGE

CROSS REFERENCE TO RELATED APPLICATION

This application is based upon and claims the benefit of priority from Japanese Patent Application No. 2003-177830, filed on Jun. 23, 2003, the entire contents of which are incorporated herein by reference.

BACKGROUND OF THE INVENTION

1. Field of the Invention

The present invention relates to an image-capturing apparatus which captures an image and applies at least color reproduction processing to the image.

2. Description of the Related Art

Conventional image-capturing apparatuses such as a digital still camera capture images to perform color reproduction processing on the images. The color reproduction processing uses color reproduction matrices (for example, a matrix with three rows and three columns). For such color reproduction processing, color reproduction matrices corresponding to appropriate color temperatures are pre-recorded for each illuminant, so that the image-capturing apparatuses determine what is an illuminant at the time of shooting and determine a color reproduction matrix suitable for the illuminant.

The illuminant determination is made according to the color temperature which is continuously variable. Thus, the above-described color reproduction matrices which correspond to appropriate color temperatures are inadequate for color reproduction processing. Japanese Unexamined Patent Application Publication No. Hei 10-191378, for example, discloses an image-capturing apparatus which obtains a new color reproduction matrix through interpolation processing based on a plurality of color reproduction matrices. In this invention, the illuminant is assumed to be natural light only (i.e., a single illuminant of natural light).

In actual shooting, however, subjects are illuminated with a plurality of kinds of illuminants (hereinafter, referred to as combined illuminant). One example of such a combined illuminant is of natural light and fluorescent light. Thus, Japanese Unexamined Patent Application Publication No. Hei 10-191378 may fail to perform proper color reproduction processing because only natural light is considered as illuminant therein.

In view of solving this problem, color reproduction matrices for each combined illuminant to be in actual use may be recorded on memories in advance, as well as the color reproduction matrices for each illuminant. Nevertheless, it is disadvantageous because the recording of the color reproduction matrices for all possible combined illuminants requires an enormous memory capacity.

SUMMARY OF THE INVENTION

It is thus an object of the present invention to provide an image-capturing apparatus which can perform proper color reproduction processing in accordance with an illuminant or illuminants that illuminates/illuminate the subject without increasing memory capacity.

To achieve the foregoing object, an image-capturing apparatus of the present invention includes: an image-capturing unit shooting a subject to generate an image thereof; a recording unit recording thereon one or more color reproduction matrices in association with each of a plurality of predetermined kinds of illuminants; a computing unit computing a corrected color reproduction matrix by interpolation processing according to at least two color reproduction matrices of the color reproduction matrices recorded on the recording unit, the at least two reproduction matrices being associated with different kinds of illuminants; and a color reproduction processing unit applying color reproduction processing to the image generated by the image-capturing unit, by using the corrected color reproduction matrix.

To achieve the foregoing object, another image-capturing apparatus of the present invention includes: an image-capturing unit shooting a subject to generate an image thereof; a recording unit recording thereon two or more color reproduction matrices in association with at least one predetermined artificial illuminant; a computing unit computing a corrected color reproduction matrix by interpolation processing according to at least two color reproduction matrices of the color reproduction matrices recorded on the recording unit; and a color reproduction processing unit applying color reproduction processing to the image generated by the image-capturing unit, by using the corrected color reproduction matrix.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described in detail with reference to the drawings. The embodiments will use a digital still camera as an example of the image-capturing apparatus according to the present invention.

First Embodiment

Hereinafter, a first embodiment of the present invention will be described in detail with reference to the drawings.

Figure 1:
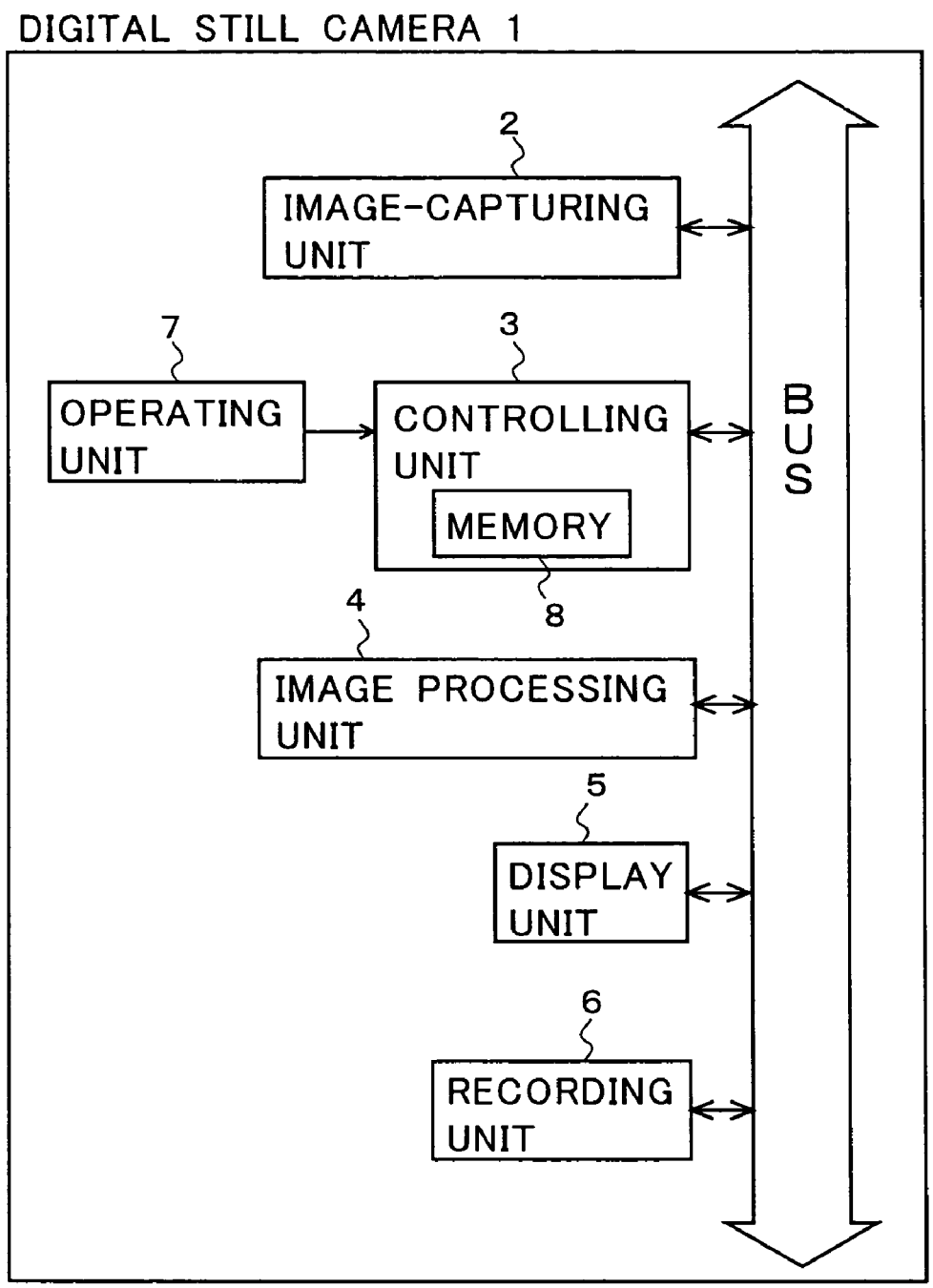
FIG. 1 is a functional block diagram of a digital still camera 1 according to a first embodiment.

FIG. 1 is a functional block diagram of a digital still camera 1 according to the first embodiment. As shown in FIG. 1, the digital still camera 1 includes an image-capturing unit 2, a controlling unit 3, an image processing unit 4, a display unit 5, and a recording unit 6. These units are connected with each other via a bus.

The image processing unit 4 is provided with a white balance adjusting part, a color reproduction processing part, etc. (not shown). The image-capturing unit 2 includes an optical system, various types of sensors for measuring a shooting distance to the subject and the like, an image-capturing device, and an A/D converter which are not shown. A memory 8 in the controlling unit 3 previously contains operation programs of the respective units. The memory 8 also contains a plurality of color reproduction matrices for use in color reproduction processing to be described in detail later.

The digital still camera 1 also has an operating unit 7. In FIG. 1, the output of the operating unit 7 is connected to the controlling unit 3. The operating unit 7 includes a power button and a release button which are not shown.

In the digital still camera 1 having the foregoing configuration, with a press on the not-shown power button, the controlling unit 3 instructs the individual units to start capturing a through image for display. The controlling unit 3 also starts calculating a white balance gain value (hereinafter, referred to as WB gain value) based on the captured through image.

With a press on the not-shown release button of the operating unit 7, the controlling unit 3 captures the image of the subject through the individual units, and applies predetermined image processing (such as white balance adjustment and color reproduction processing) to the captured image via the image processing unit 4. The controlling unit 3 then records the image generated through the image processing onto the recording unit 6, and displays the same on the display unit 5.

Note that the image-capturing unit 2 and the controlling unit 3 correspond to the image-capturing unit in claims. The memory 8 corresponds to the recording unit in claims. The controlling unit 3 and the memory 8 correspond to the computing unit in claims. The controlling unit 3 and the image processing unit 4 correspond to the color reproduction processing unit in claims.

Hereinafter, description will be given of a feature of the present invention, the color reproduction processing.

Figure 2:
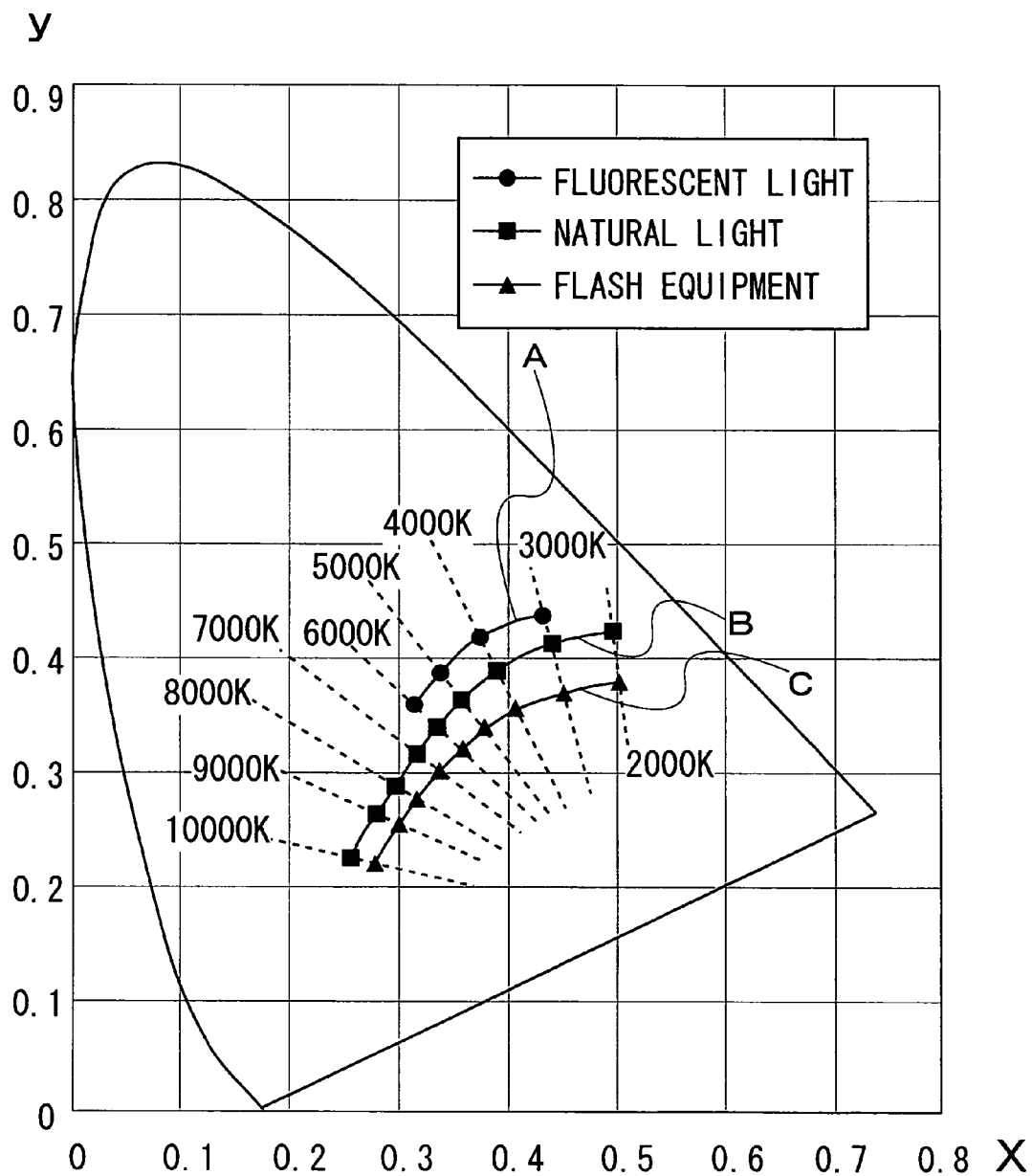
FIG. 2 illustrates a plurality of color reproduction matrices to be recorded on a memory 8 of the digital still camera 1 according to the first embodiment.

Description will first be given of a plurality of color reproduction matrices recorded on the memory 8. FIG. 2 shows changes of the color temperatures for each illuminants as loci in the system of coordinates in a uniform color space Yxy. In FIG. 2, the curve A is a locus as change of the color temperature when the illuminant is a fluorescent light, the curve B when the illuminant is natural light, and the curve C when the illuminant is a flash from a flash device. The broken lines (hereinafter, referred to as isothermal lines) indicate color temperatures (2000 K to 10000 K).

At the intersections (●, ■, ▲) between the curves A-C and the isothermal lines color reproduction matrices are recorded in association with the position coordinates, respectively. Here, the color reproduction matrices are ones having three rows and three columns, for example. The color reproduction matrices associated with a fluorescent light are recorded at the intersections ● on the curve A. The color reproduction matrices associated with natural light are recorded at the intersections ■ on the curve B. The color reproduction matrices associated with a flash from a flash device are recorded at the intersections ▲ on the curve C.

Next, the computation of a corrected color reproduction matrix, or an optimum color reproduction matrix for the illuminant(s) at the time of shooting, will be described with reference to the flowchart of FIG. 3.

The first embodiment describes an example where the subject is illuminated with a plurality of illuminants (combined illuminant).

At step S1, the controlling unit 3 calculates the position coordinates of the illuminant at the time of shooting on the Yxy plane. Specifically, a WB gain value is calculated from the captured image to calculate the position coordinates on the Yxy plane based on this WB gain value.

At step S2, it is determined whether or not the position coordinates calculated at step S1 are included in any of the isothermal lines in FIG. 2 (the position coordinates fall on any of the isothermal lines). If the position coordinates calculated at step S1 are included in one of the isothermal lines in FIG. 2, the controlling unit 3 proceeds to step S3. If the position coordinates calculated at step S1 are not included in any of the isothermal lines in FIG. 2, the controlling unit 3 proceeds to step S4.

At step S3, the controlling unit 3 computes a corrected color reproduction matrix.

Figure 4:
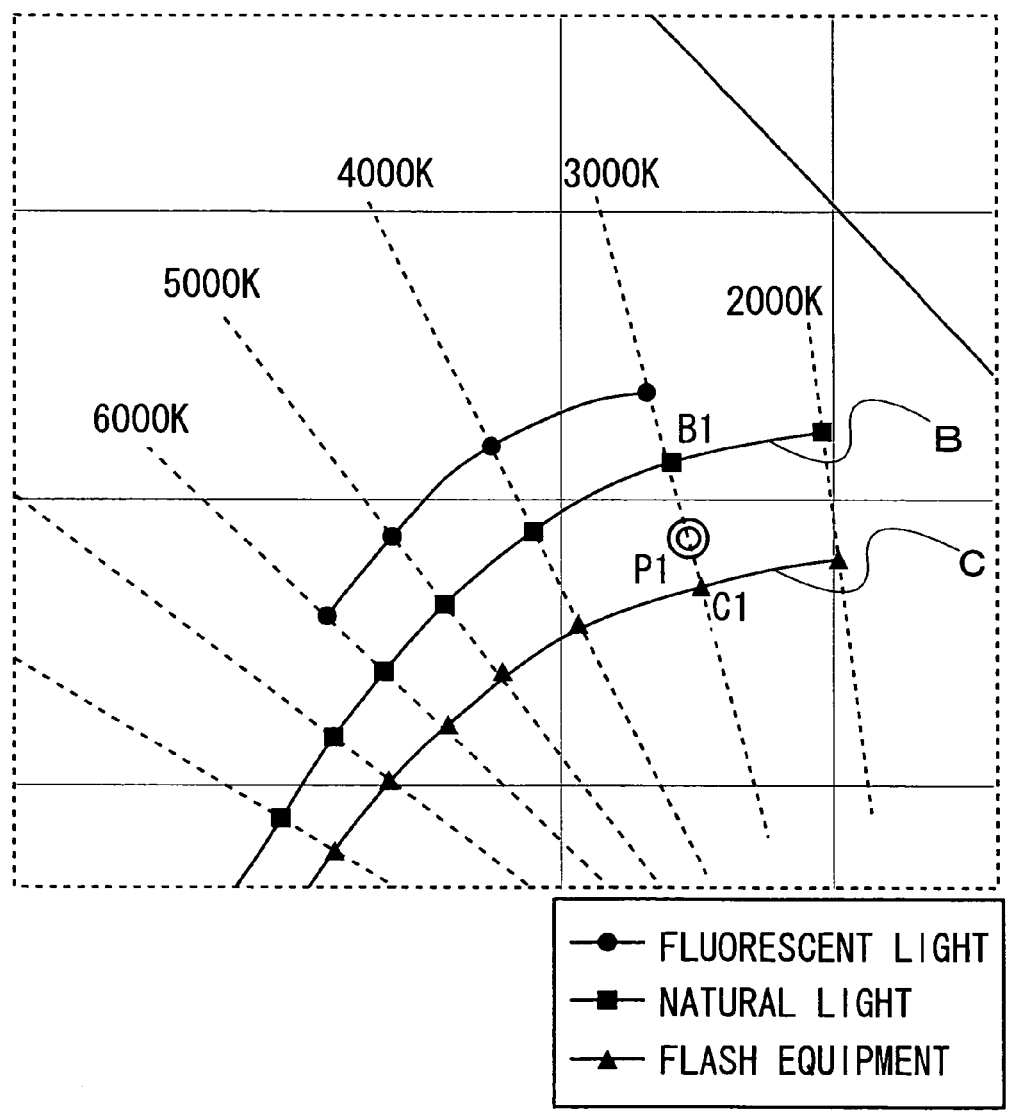
FIG. 4 is a diagram for explaining the computation of a corrected color reproduction matrix.

FIG. 4 shows an example where the position coordinates calculated at step S1 are included in one of the isothermal lines in FIG. 2. FIG. 4 is an enlarged partial diagram of FIG. 2. The point P1 in FIG. 4 represents the position coordinates calculated at step S1. In FIG. 4, the position coordinates P1 calculated at step S1 are included in the isothermal line of 3000 K as a way of example.

Initially, the controlling unit 3 selects two points with shortest distances from the point P1, among the position coordinates on the 3000-K isothermal line at which color reproduction matrices are recorded. In FIG. 4, the point B1 and the point C1 are selected. The point B1 is on the curve B when the illuminant is natural light; the point C is on the curve C when the illuminant is a flash from a flash device. The points are selected from different curves because the subject is illuminated with a plurality of illuminants (combined illuminant). The selection of the points from the different curves means that color reproduction matrices associated with different illuminants are selected.

Then, the controlling unit 3 calculates the Euclidean distances from the points B1 and C1 to the point P1, respectively, and determines a weighted average of the color reproduction matrices recorded in association with the points B1 and C1 according to the distances. The calculated corrected color reproduction matrix is computed through interpolation processing on the basis of the color reproduction matrices recorded in association with the points B1 and C1.

Figure 3:
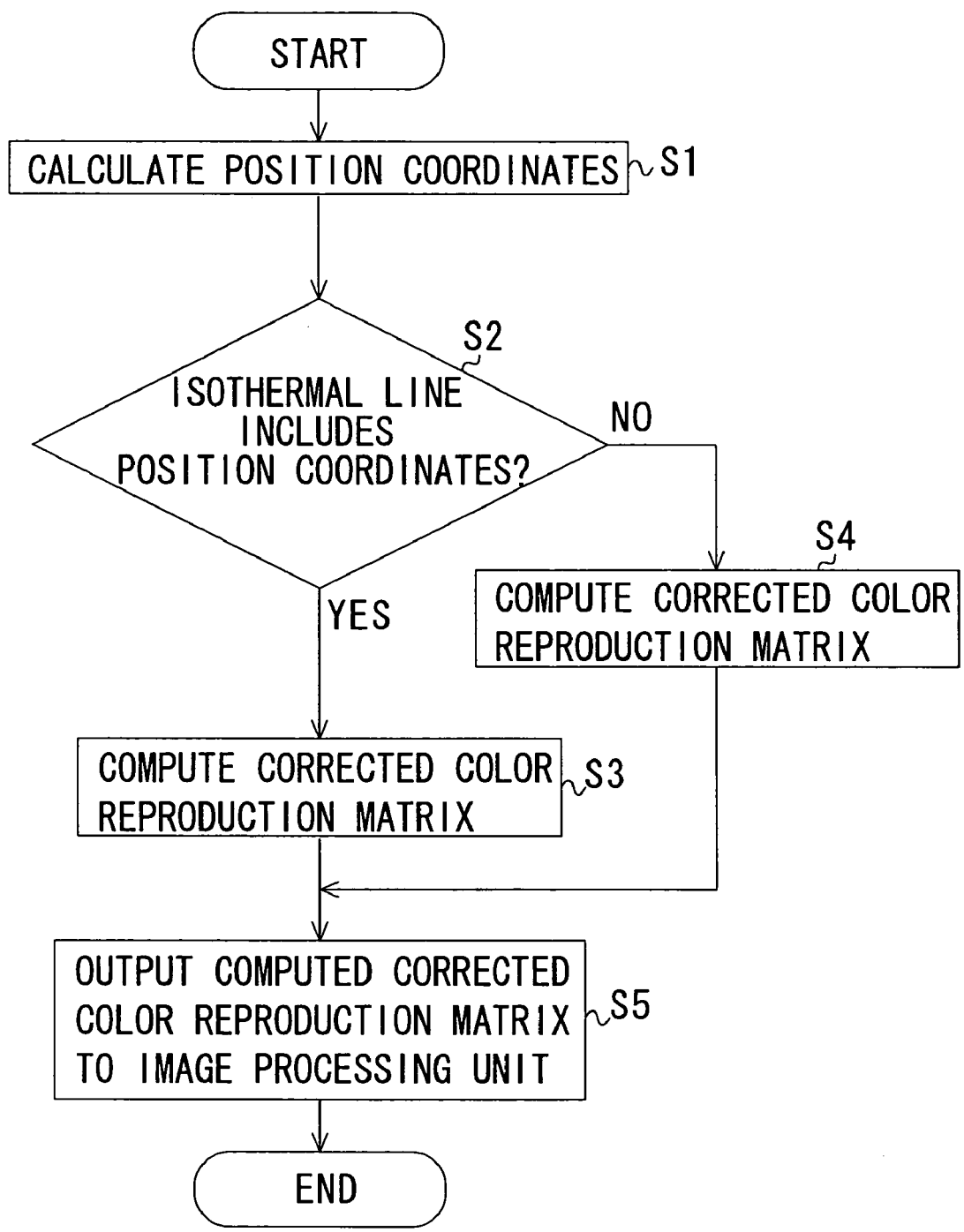
FIG. 3 is a flowchart for the operation of the digital still camera 1 according to the first embodiment.

Meanwhile, at step S4 of FIG. 3, the controlling unit 3 computes a corrected color reproduction matrix.

Figure 5:
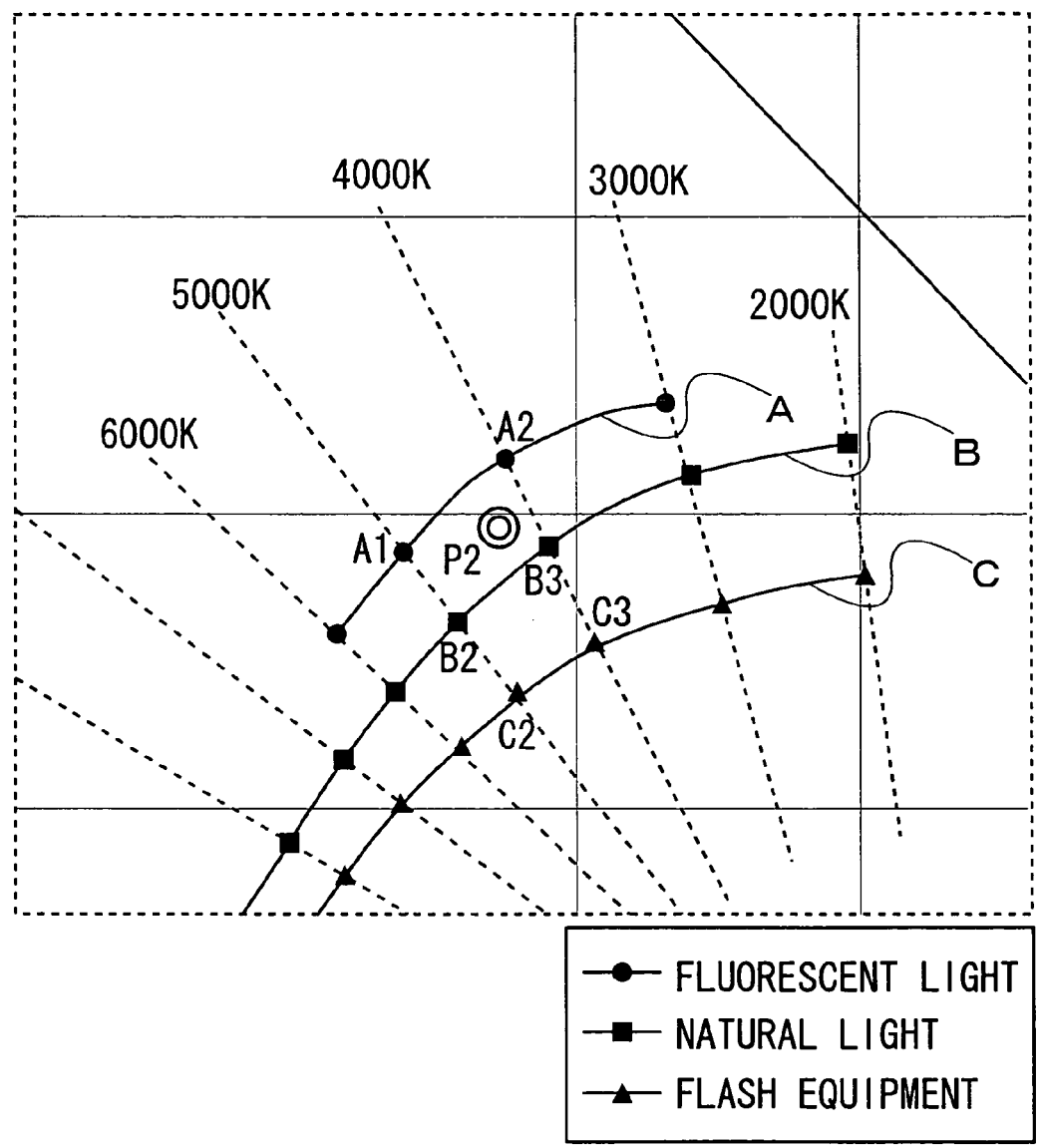
FIG. 5 is a diagram for explaining the computation of a corrected color reproduction matrix.

FIG. 5 shows an example where the position coordinates calculated at step S1 are not included in any of the isothermal lines in FIG. 2. FIG. 5 is an enlarged partial diagram of FIG. 2. The point P2 in FIG. 5 represents the position coordinates calculated at step S1. In the example of FIG. 5, the position coordinates P2 calculated at step S1 are not included in any of the isothermal lines.

Initially, the controlling unit 3 selects four points with shortest distances from the point P2 among the position coordinates at which color reproduction matrices are recorded. In FIG. 5, the points A1 and A2 are on the curve A when the illuminant is a fluorescent light and the points B2 and B3 on the curve B when the illuminant is natural light are selected. The points are selected from different curves because the subject is illuminated with a plurality of illuminants (combined illuminant).

Then, the controlling unit 3 calculates the Euclidean distances between the points A1, A2, B2, and B3 and the point P2, and determines a weighted average of the color reproduction matrices recorded in association with the points A1, A2, B2, and B3 according to the distances. The corrected color reproduction matrix calculated thus is computed through interpolation processing on the basis of the color reproduction matrices recorded in association with the points A1, A2, B2, and B3.

Subsequently, at step S5 of FIG. 3, the controlling unit 3 outputs the corrected color reproduction matrix calculated at either step S3 or step S4 to the image processing unit 4, and terminates the series of processing. Then, by using the corrected color reproduction matrix computed thus, the image processing unit 4 applies color reproduction processing to the image captured by the image-capturing unit 2.

Figure 6:
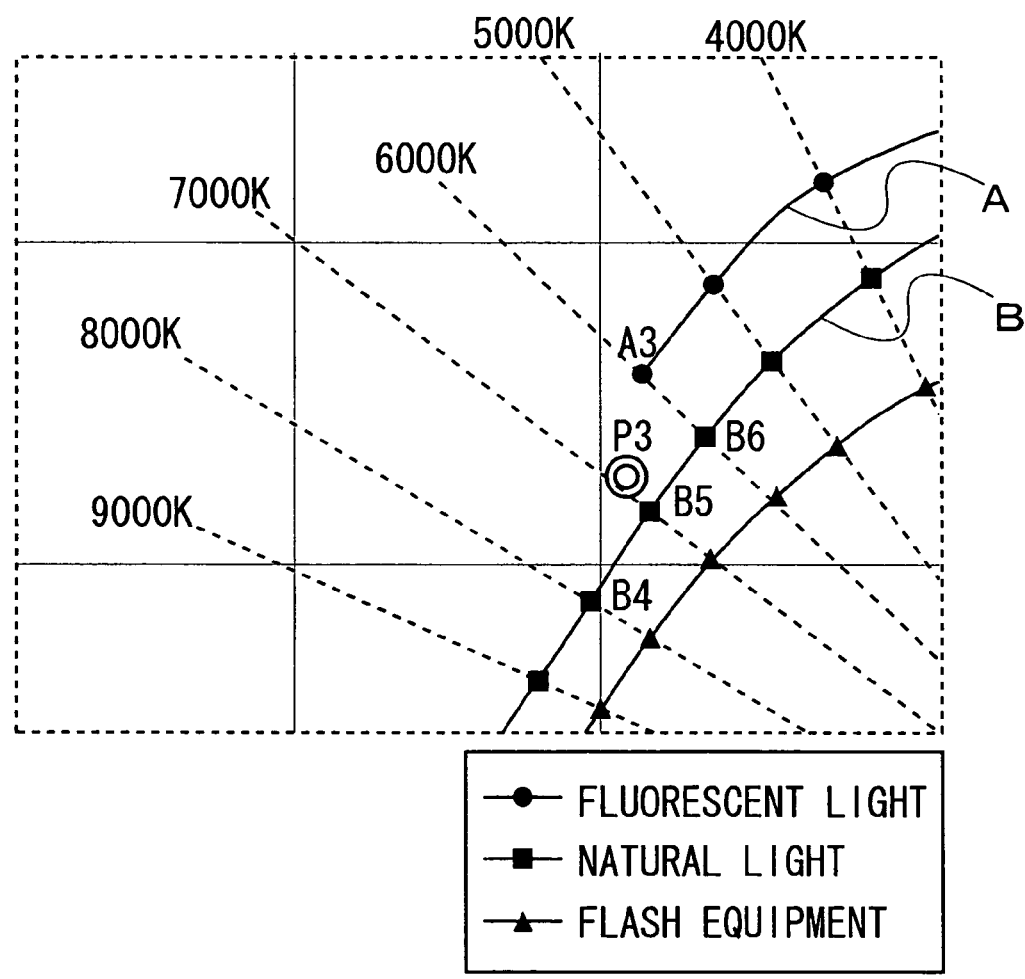
FIG. 6 is a diagram for explaining the computation of a corrected color reproduction matrix.

Note that the present embodiment has dealt with the case where the corrected color reproduction matrix is computed from four selected points (see step S4) if the position coordinates calculated at step S1 are not included in any of the isothermal lines in FIG. 2 (see FIG. 5). Description will now be given of exceptions. As shown in FIG. 6 (FIG. 6 is an enlarged partial diagram of FIG. 2), when position coordinates P3 calculated at step S1 are not surrounded by four points, the controlling unit 3 computes the corrected color reproduction matrix by selecting three points with shortest distances from the point P3 out of the position coordinates at which color reproduction matrices are recorded.

In FIG. 6, when the controlling unit 3 selects four points with shortest distances from the point P3 out of the position coordinates at which color reproduction matrices are recorded, the four points will be the points A3, B4, B5, and B6, and three of them are on the curve B. However, it is defined here that the number of points selectable on one curve are two, so that the controlling unit 3 selects only two points on the curve B, and does not select the point B4 in FIG. 6.

The present embodiment has also dealt with the case where the corrected color reproduction matrix is computed by selecting ones with shortest distances from the position coordinates calculated at step S1 among the position coordinates at which color reproduction matrices are recorded. The computation may also involve illuminant determination. For example, flicker detection is performed to determine that one of the illuminants is a fluorescent light, and then determine the presence or absence of a flash emitted from a flash device. If judged that the illuminants are combination of a fluorescent light and a flash from a flash device, the corrected color reproduction matrix is computed with the result of judgment taken into consideration. For example, if the position coordinates calculated at step S1 are at the point P2 in FIG. 5, points will be selected from the curve A (a fluorescent light as the illuminant) and the curve C (a flash from a flash device as the illuminant) with the curve B (natural light as the illuminant) excluded. Then, computation is done using the color reproduction matrices recorded in association with the points A1, A2, C2, and C3 for more proper color reproduction processing.

As has been described, according to the first embodiment, one or more color reproduction matrices are recorded in association with each of a plurality of predetermined illuminants (fluorescent light, natural light, and a flash from a flash device) in advance. Of these color reproduction matrices, at least two color reproduction matrices are subjected to interpolation processing to compute a corrected color reproduction matrix, and this corrected color reproduction matrix is used for color reproduction processing. It is therefore possible to perform proper color reproduction processing.

In particular, as described in the present embodiment, the corrected color reproduction matrix is computed by performing interpolation processing according to at least two color reproduction matrices that are associated with different illuminants. Thus, it is possible to perform proper color reproduction processing even when the subject is illuminated with a plurality of illuminants (combined illuminant).

Moreover, according to the first embodiment, several (twelve, in the present embodiment) color reproduction matrices are recorded on the memory 8 in advance, to compute an optimum corrected color reproduction matrix through the interpolation processing in accordance with the image to be processed. This can eliminate the need to record color reproduction matrices for all possible combined illuminants, thereby preventing an increase in memory capacity.

In addition, according to the present embodiment, color reproduction matrices are recorded in association with each of natural light and at least one artificial illuminant (in the present embodiment, a fluorescent light and a flash from a flash device). It is therefore possible to perform proper color reproduction processing even if the subject is illuminated with the combined illuminant of natural light and an artificial illuminant.

Furthermore, according to the present embodiment, the illuminants associated with the color reproduction matrices recorded on the memory 8 are expressed as loci in the system of coordinates in the color space. The corrected color reproduction matrix is computed through interpolation processing, or by determining a weighted average of the color reproduction matrices based on the position coordinates in the system of coordinates. This can simplify the computation, and reduce the load on the controlling unit 3 of the digital still camera 1.

In the first embodiment, at step S2 the determination is made as to whether or not each of the isothermal lines includes the position coordinates calculated at step S1. The determination may also be made by the following way. That is, the isothermal lines as subjects of determination are provided with more latitude each, so that it may be determined whether or not the position coordinates calculated at step S1 fall within predetermined ranges including the respective curves.

Second Embodiment

Hereinafter, a second embodiment of the present invention will be described in detail with reference to the drawings. Description of the second embodiment will be made only on parts different from those of the first embodiment.

A digital still camera 10 (not shown) of the second embodiment is configured the same as the digital still camera 1 of the first embodiment. A memory 18 in a controlling unit 13 (both not-shown) of the digital still camera 10 contains programs different from those of the first embodiment. As in the first embodiment, the memory 18 also contains a plurality of color reproduction matrices for use in color reproduction processing.

Figure 7:
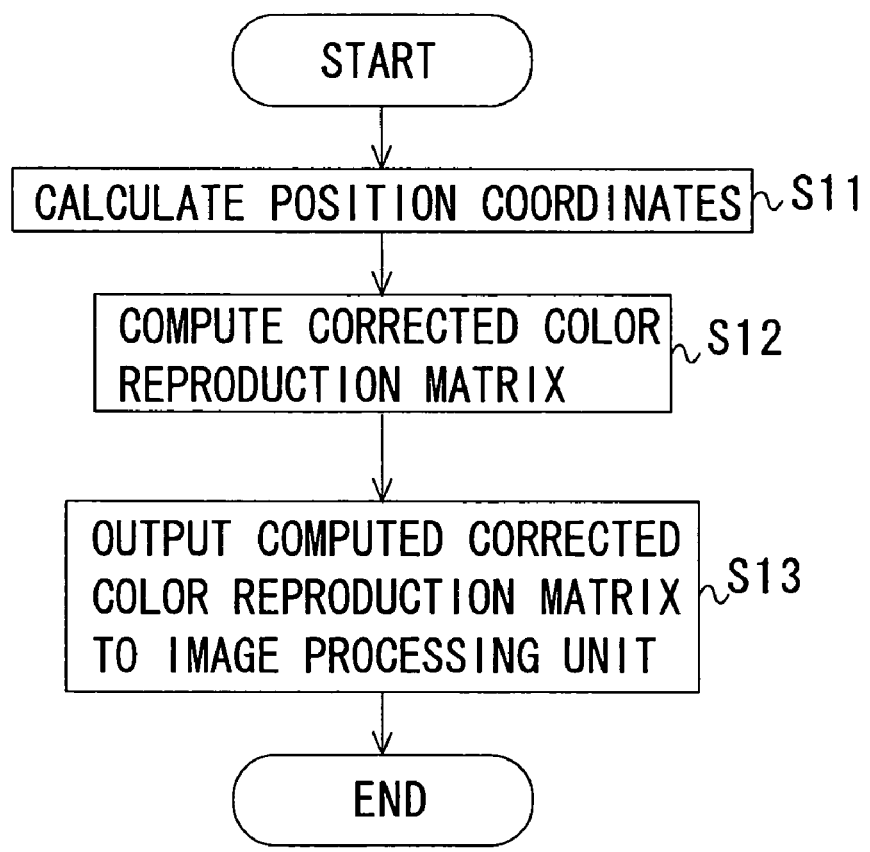
FIG. 7 is a flowchart for the operation of a digital still camera 10 according to a second embodiment.

Hereinafter, the computation of a corrected color reproduction matrix according to the second embodiment will be described with reference to the flowchart of FIG. 7. The second embodiment describes on an example where the subject is illuminated with a single illuminant.

At step S11, the controlling unit 13 calculates the position coordinates of the illuminant at the time of shooting on the Yxy plane. Specifically, a WB gain value is calculated from the captured image to calculate the position coordinates on the Yxy plane based on this WB gain value.

At step S12, the controlling unit 13 computes a corrected color reproduction matrix.

Figure 8:
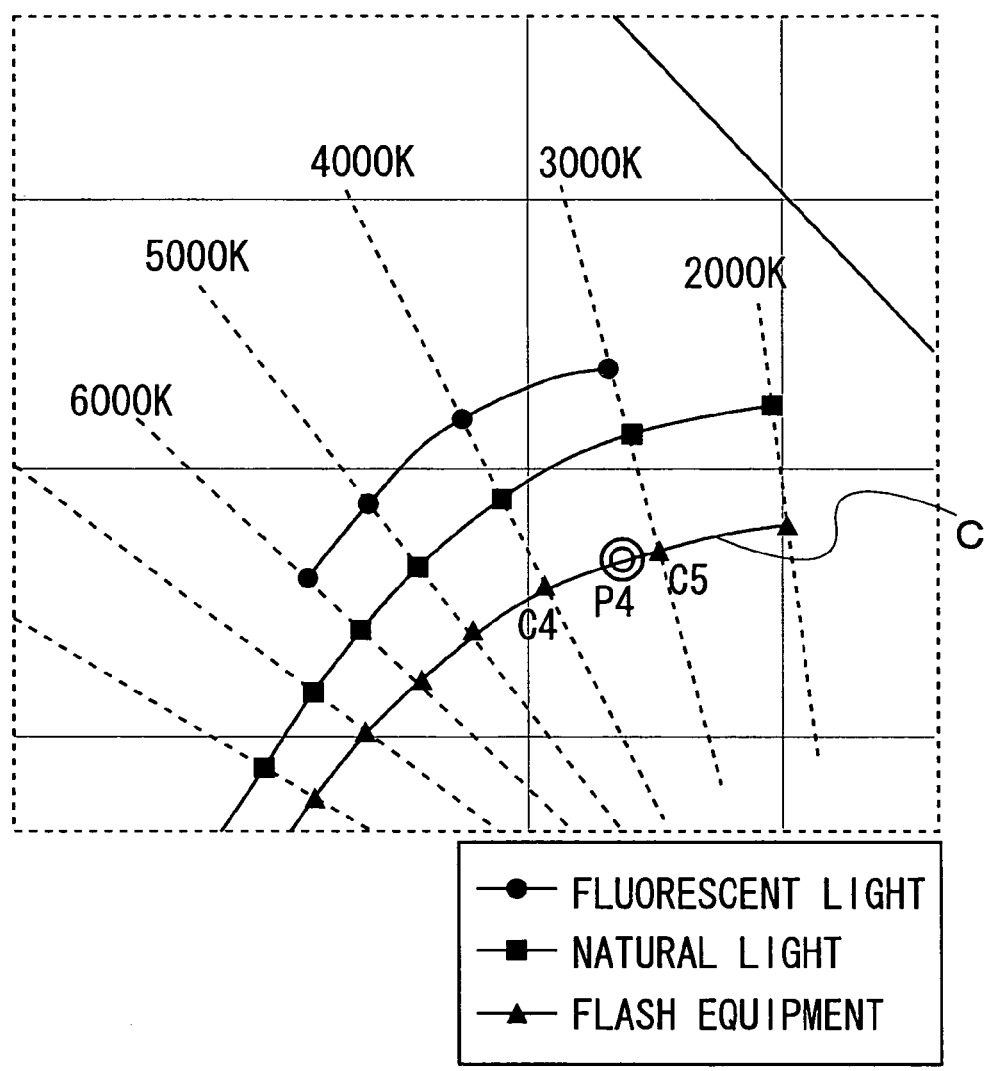
FIG. 8 is a diagram for explaining the computation of a corrected color reproduction matrix.

When the subject is shot with a single illuminant, the position coordinates calculated at step S11 fall on one of the curves A to C. An example is shown in FIG. 8 which is an enlarged partial diagram of FIG. 2. The point P4 in FIG. 8 represents the position coordinates calculated at step S11. In FIG. 8, the position coordinates P4 calculated at step S11 are included in the curve C which shows the case where the illuminant is a flash from a flash device.

Initially, the controlling unit 13 selects two points with shortest distances from the point P4 among the position coordinates on the curve C at which color reproduction matrices are recorded. FIG. 8 shows an example where the points C4 and C5 on the curve C are selected. Then, the controlling unit 13 calculates the Euclidean distances between the points C4 and C5, and the point P4, and determines a weighted average of the color reproduction matrices recorded in association with the points C4 and C5 according to the distances. The computation of the corrected color reproduction matrix calculated thus is made through interpolation processing according to the color reproduction matrices recorded in association with the points C4 and C5.

At step S13, the controlling unit 13 outputs the corrected color reproduction matrix calculated at step S12 to the image processing unit 4, and terminates the series of processing. Then, by using the computed corrected color reproduction matrix, the image processing unit 4 applies color reproduction processing to the image captured by the image-capturing unit 2.

As has been described, according to the second embodiment, when the subject is illuminated with a single illuminant, the corrected color reproduction matrix is computed by interpolating color reproduction matrices that are recorded in association with the illuminant. In particular, even when the single illuminant is artificial light, color reproduction matrices recorded in association with the artificial illuminant are interpolated to compute a corrected color reproduction matrix.

In the prior art, it may not possible to perform proper color reproduction processing if the illuminant is an artificial illuminant (a fluorescent light, a flash from a flash device). This is because the color temperature of fluorescent lights changes sharply due to degradation, and also varies depending on by which manufacturer it is made. Similarly, in the case of a flash from a flash device, the variances in the color temperature are ascribable to the fact that various manufacturers make different flash devices which have different color temperatures. The color temperature thereof also varies due to light attenuation with time after flash emission.

According to the present embodiment, a corrected color reproduction matrix is computed for the sake of color correction processing by interpolating color reproduction matrices recorded in association with artificial illuminants. It is therefore possible to remedy the foregoing problem, and perform appropriate color correction processing even when the single illuminant is artificial light.

The foregoing embodiments have dealt with the cases where the corrected color reproduction matrix is computed (steps S3 and S4 of FIG. 3, and step S12 of FIG. 7) by calculating Euclidean distances and determining a weighted average based on the distances, however, the weighted average may be determined after additional weighting is done. For example, if the user specifies an illuminant for white balancing, weights may be assigned so as to greatly reflect the characteristics of the color reproduction matrices of the specified illuminant.

The foregoing embodiments have dealt with the cases where the white balance gain value is calculated according to the captured image, i.e., the image from the image-capturing device. Nevertheless, the digital still camera 1 or the digital still camera 10 may be provided with sensors capable of measuring color balance and the like, in addition to the image-capturing device.

While the foregoing embodiments have dealt with the cases where a fluorescent light, natural light, and a flash from a flash device are used for the illuminants, other illuminants may also be used.

The processings described in the first embodiment and the second embodiment both may be applied to a single digital still camera. In this case, the programs shall include a step of determining whether the illuminant is a single illuminant or a combined illuminant. The illuminant can be determined by determining if the position coordinates calculated at step S1 or step S11 are included in any of the curves A-C.

The invention is not limited to the above embodiments and various modifications may be made without departing from the spirit and scope of the invention. Any improvement may be made in part or all of the components.

What is claimed is:

1. An image-capturing apparatus comprising:
   an image-capturing unit shooting a subject to generate an image thereof;
   a recording unit recording thereon one or more of color reproduction matrices in association with each of a plurality of kinds of illuminants including natural light and at least one kind of artificial illumination device;
   a white balance gain calculating unit calculating an evaluated value relating to a white balance gain to be applied to the image;
   a computing unit selecting at least two of the color reproduction matrices which are associated with different kinds of illuminants from the color reproduction matrices recorded on said recording unit based on the evaluated value, and computing a correction color reproduction matrix based on at least two of the color reproduction matrices being selected by interpolation processing; and
   a color reproduction processing unit applying color reproduction processing to the image generated by said image-capturing unit, by using the corrected color reproduction matrix,
   wherein said computing unit expresses the kinds of illuminants associated with the color reproduction matrices recorded on said recording unit as loci in system of coordinates in a color space, and computes the corrected color reproduction matrix through interpolation processing by determining a weighted average of the color reproduction matrices based on position coordinates in the system of coordinates.

2. The image-capturing apparatus according to claim 1, wherein:
   said recording unit records two or more of the color reproduction matrices in association with at least one kind of illuminant of the plurality of kinds of illuminants including natural light and at least one kind of artificial illumination device; and
   said computing unit computes the corrected color reproduction matrix by interpolation processing according to at least two of the color reproduction matrices and to at least one of the color reproduction matrices among the color reproduction matrices recorded on said recording unit, the at least two of the color reproduction matrices being associated with the at least one kind of illuminant, the at least one of the color reproduction matrices being associated with an illuminant of a different kind from that of the at least one kind of illuminant.

* * * * *